United States Patent
Kubo et al.

(10) Patent No.: US 6,617,006 B1
(45) Date of Patent: Sep. 9, 2003

(54) BIAXIALLY ORIENTED POLYESTER FILM TO BE LAMINATED ON A METAL PLATE AND MOLDED

(75) Inventors: Koji Kubo, Sagamihara (JP); Masahiko Kosuge, Sagamihara (JP); Shunsuke Kubota, Matsuyama (JP); Kinji Hasegawa, Sagamihara (JP); Nobuo Minobe, Matsuyama (JP); Kimihiko Sato, Matsuyama (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/914,997

(22) PCT Filed: Jan. 5, 2001

(86) PCT No.: PCT/JP01/00025
§ 371 (c)(1),
(2), (4) Date: Sep. 7, 2000

(87) PCT Pub. No.: WO01/49778
PCT Pub. Date: Jul. 12, 2001

(30) Foreign Application Priority Data

| Jan. 7, 2000 | (JP) | 2000-001863 |
| Jan. 11, 2000 | (JP) | 2000-002501 |
| Jan. 12, 2000 | (JP) | 2000-003412 |

(51) Int. Cl.[7] .......... B32B 15/08; B32B 27/18; B32B 27/20; B32B 27/36
(52) U.S. Cl. .......... 428/141; 428/323; 428/328; 428/329; 428/330; 428/331; 428/458; 428/480; 428/910; 524/323; 524/327; 524/394; 524/398; 528/302; 528/305; 528/308; 528/308.6
(58) Field of Search .......... 428/35, 8, 141, 428/323, 327, 328, 329, 330, 331, 457, 458, 480, 910; 524/323, 327, 394, 398; 528/302, 305, 308, 308.6

(56) References Cited

U.S. PATENT DOCUMENTS

| 5,188,774 A | * | 2/1993 | Nitta et al. ........... 264/466 |
| 5,747,174 A | * | 5/1998 | Kimura et al. ........ 428/480 |
| 5,886,133 A | * | 3/1999 | Hilbert et al. ........ 528/279 |
| 6,048,626 A | * | 4/2000 | Tsuzuki et al. ....... 428/480 |
| 6,054,224 A | * | 4/2000 | Nagai et al. .......... 428/480 |
| 6,086,989 A | * | 7/2000 | Kubo et al. ........... 428/335 |
| 6,365,659 B1 | * | 4/2002 | Aoyama et al. ....... 524/399 |
| 6,372,326 B1 | * | 4/2002 | Kosuge et al. ........ 428/141 |
| 6,465,063 B1 | * | 10/2002 | Hayakawa et al. ..... 428/35.1 |
| 6,500,915 B1 | * | 12/2002 | Fujimori et al. ...... 528/279 |

FOREIGN PATENT DOCUMENTS

| EP | 962483 | 12/1999 |
| JP | A 55-23136 | 2/1980 |
| JP | A 56-10451 | 2/1981 |
| JP | A 64-22530 | 1/1989 |
| JP | 1-161025 | 6/1989 |
| JP | A 1-192545 | 8/1989 |
| JP | A 1-192546 | 8/1989 |
| JP | A 2-57339 | 2/1990 |
| JP | A 5-339348 | 12/1993 |
| JP | 05-339357 A | * 12/1993 |
| JP | A 6-39979 | 2/1994 |
| JP | A 6-116376 | 4/1994 |
| JP | 06-170911 A | * 6/1994 |
| JP | A 8-40437 | 2/1996 |
| JP | A 9-70934 | 3/1997 |
| JP | A 9-241361 | 9/1997 |
| JP | A 10-231413 | 9/1998 |
| JP | 11-147964 | 6/1999 |
| JP | A 11-349792 | 12/1999 |
| JP | 2001-019751 A | * 1/2001 |

* cited by examiner

Primary Examiner—Vivian Chen
(74) Attorney, Agent, or Firm—Sughrue Mion, PLLC

(57) ABSTRACT

A biaxially oriented polyester film to be laminated on a metal plate and molded, which comprises an aromatic polyester composition comprising:

(A) an aromatic polyester which comprises ethylene terephthalate as the main recurring unit and a titanium compound and a phosphorus compound both of which satisfy at least one of the following expressions (1) and (2):

$$0.1 \leq Ti/P \leq 3.0 \tag{1}$$

$$5 \leq Ti+P \leq 60 \tag{2}$$

wherein Ti is the amount (mmol %) of elemental titanium of the titanium compound contained in this aromatic polyester and P is the amount (mmol %) of elemental phosphorus of the phosphorus compound contained in the aromatic polyester, and the following expression (3):

$$2 \leq Ti \leq 20 \tag{3}$$

wherein Ti is as defined hereinabove, and which contains alkali metal compounds, germanium compound and antimony compound in a total amount of not more than 3 ppm in terms of the total of elemental alkali metals, elemental germanium and elemental antimony; and (B) 0.05 to 5.0 wt % based on the aromatic polyester composition of inert fine particles having an average particle diameter of 2.5 μm or less.

30 Claims, No Drawings

BIAXIALLY ORIENTED POLYESTER FILM TO BE LAMINATED ON A METAL PLATE AND MOLDED

FIELD OF THE INVENTION

The present invention relates to a polyester film to be laminated on a metal plate and molded. More specifically, it relates to a polyester film to be laminated on a metal plate and molded, which exhibits excellent moldability when it is laminated on a metal plate and subjected to a can making process such as drawing and from which metal cans having excellent heat resistance, retort resistance, taste and flavor retention properties, impact resistance and corrosion resistance, such as drink cans and food cans, can be produced.

DESCRIPTION OF THE PRIOR ART

Metal cans are generally coated on the interior and exterior sides to prevent corrosion. Recently, the development of methods for obtaining corrosion resistance without using an organic solvent has been promoted to simplify production process, improve sanitation and prevent pollution. One of the methods is to coat a metal can with a thermoplastic resin film. That is, studies on a method for making cans by laminating a thermoplastic resin film on a metal plate such as a tin, tin-free steel or aluminum plate and drawing the laminated metal plate are under way. A polyolefin film or polyamide film has been tried as this thermoplastic resin film but does not satisfy all the requirements such as moldability, heat resistance, impact resistance, and taste and odor retention properties.

Then, a polyester film, particularly a polyethylene terephthalate film attracts much attention as a film having well-balanced properties and there have been made some proposals based on this film (JP-A 56-10451, JP-A 64-22530, JP-A 1-192545, JP-A 1-192546 and JP-A 2-57339) (the term "JP-A" as used herein means an "unexamined published Japanese patent application"). However, studies conducted by the present inventors have revealed that, in the case of molding accompanied by large deformation, the film does not satisfy all the requirements such as moldability, retort resistance, and taste and flavor retention properties.

A copolyester film has been studied as a film which is satisfactory in terms of moldability, heat resistance, impact resistance, and taste and flavor retention properties. JP-A 5-339348 discloses a polyester film to be laminated on a metal plate and molded, which is made from a copolyester having a specific melting point, glass transition temperature and terminal carboxyl group concentration. JP-A 6-39979 proposes a polyester film to be laminated on a metal plate and molded, which is a copolyester laminate film having a specific melting point and glass transition temperature. However, studies conducted by the present inventors have clarified that when cans covered with these films are used as drink containers, a change in flavor or taste is detected according to the type of a drink as disclosed by JP-A 55-23136.

JP-A 6-116376 proposes a polyester film to be laminated on a metal plate and molded, which is made from a copolyester containing specific amounts of elemental alkali metals and elemental germanium. When this film is used, it exhibits excellent taste and flavor retention properties in a process in which it is not heated while containing contents, such as a cold pack system, but does not always achieve sufficient taste and flavor retention properties in a process in which it is heated while containing contents, such as a retort treatment.

JP-A 8-40437 discloses a polyester film which contains specific amounts of an oligomer and elemental alkali metals and JP-A 9-241361 and JP-A 10-231413 propose a film made from a copolyester which has specific contents of alkali metals and a catalytic metal compound and contains a phosphorus compound in a specific ratio. Even when these films are used, they are still unsatisfactory in terms of polyester productivity and heat deterioration during the production of a biaxially oriented film. Further improvement in performance has been desired.

Moreover, JP-A 9-70934 proposes a laminated polyester film which contains a specific amount of a specific metal but this film is unsatisfactory in terms of resistance to hydrolysis in a process in which a heat treatment is carried out after contents are packed like a retort treatment and cannot always achieve satisfactory taste and flavor retention properties.

SUMMARY OF THE INVENTION

It is an object of the present invention to provide a polyester film to be laminated on a metal plate and molded, which has overcome the defects of the prior art, has improved resistance to hydrolysis and taste and flavor retention properties and higher productivity while retaining the excellent heat resistance, impact resistance, deep drawability and corrosion resistance of a polyester film, and is inexpensive and preferred from the viewpoint of sanitation.

Other objects and advantages of the present invention will become apparent from the following description.

According to the present invention, the above objects and advantages of the present invention are attained by a biaxially oriented polyester film to be laminated on a metal plate and molded, which comprises an aromatic polyester composition comprising:

(A) an aromatic polyester which comprises ethylene terephthalate as the main recurring unit and a titanium compound and a phosphorus compound both of which satisfy at least one of the following expressions (1) and (2):

$$0.1 \leq Ti/P \leq 3.0 \tag{1}$$

$$5 \leq Ti+P \leq 60 \tag{2}$$

wherein Ti is the amount (mmol %) of elemental titanium of the titanium compound contained in this aromatic polyester and P is the amount (mmol %) of elemental phosphorus of the phosphorus compound contained in the aromatic polyester, and the following expression (3):

$$2 \leq Ti \leq 20 \tag{3}$$

wherein Ti is as defined hereinabove, and which contains alkali metal compounds, a germanium compound and an antimony compound in a total amount of not more than 3 ppm in terms of the total of elemental alkali metals, elemental germanium and elemental antimony; and (B) 0.05 to 5.0 wt % based on the aromatic polyester composition of inert fine particles having an average particle diameter of 2.5 μm or less.

THE PREFERRED EMBODIMENT OF THE INVENTION

The present invention will be described in detail hereinbelow.

The aromatic polyester in the present invention is a polyester comprising ethylene terephthalate as the main recurring unit. The aromatic polyester is preferably copolyethylene terephthalate obtained by copolymerizing a third component other than the ethylene terephthalate unit as a constituent component from the viewpoints of heat resistance and moldability. The above third component (comonomer) may be either a dicarboxylic acid component or a glycol component. Examples of the dicarboxylic acid component preferably used as the third component include aromatic dicarboxylic acids such as 2,6-naphthalenedicarboxylic acid, isophthalic acid and phthalic acid; aliphatic dicarboxylic acids such as adipic acid, azelaic acid, sebacic acid and decanedicarboxylic acid; and alicyclic dicarboxylic acids such as cyclohexanedicarboxylic acid. They may be used alone or in combination of two or more. Out of these, 2,6-naphthalenedicarboxylic acid and isophthalic acid are preferred. Examples of the glycol component preferably used as the third component include aliphatic diols such as diethylene glycol, propylene glycol, neopentyl glycol, butanediol, pentanediol and hexanediol; alicyclic diols such as cyclohexane dimethanol; aromatic diols such as bisphenol A; and polyalkylene glycols such as polyethylene glycol and polypropylene glycol. They may be used alone or in combination of two or more. Out of these, diethylene glycol is preferred. The aromatic polyester of the present invention is preferably selected from the following three copolyesters:

(a) a copolyester which comprises 82 mol % or more of terephthalic acid and 18 mol % or less of isophthalic acid as dicarboxylic acid components and 82 to 100 mol % of ethylene glycol and 0 to 18 mol % of a diol other than ethylene glycol as diol components;

(b) a copolyester which comprises 82 mol % or more of terephthalic acid and 18 mol % or less of 2,6-naphthalenedicarboxylic acid as dicarboxylic acid components and 82 to 100 mol % of ethylene glycol and 0 to 18 mol % of a diol other than ethylene glycol as diol components; and (c) a copolyester which comprises terephthalic acid as the sole dicarboxylic acid component and 95 mol % or more of ethylene glycol and 5 mol % or less of diethylene glycol as glycol components.

The copolyester (b) is preferred from the viewpoints of flavor retention properties and moldability. It is preferred that the copolyester (a) should further comprise 2,6-naphthalenedicarboxylic acid as a dicarboxylic acid component because the flavor retention properties and impact resistance of the obtained copolyester are further improved. Examples of the glycol component other than ethylene glycol of the copolyesters (a) and (b) are triethylene glycol, cyclohexane dimethanol, neopentyl glycol and diethylene glycol. The copolyesters (a) and (b) comprising at least one of these glycol components are preferred from the viewpoints of flavor retention properties and moldability. It is particularly preferred that the copolyester (c) should comprise diethylene glycol in an amount of 4 mol % or less based on the total of all the glycol components. When the amount of diethylene glycol is larger than 5 mol %, heat resistance may lower. This diethylene glycol component includes a diethylene glycol component by-produced in situ during the production of an aromatic copolyester comprising ethylene glycol as a glycol component.

The aromatic polyester of the present invention can be synthesized by any method. In the case of copolyethylene terephthalate comprising isophthalic acid as the third component, a first-stage reaction for forming a glycol ester of terephthalic acid-isophthalic acid and/or a low polymer thereof is carried out through an ester exchange reaction between lower alkyl esters of terephthalic acid and isophthalic acid and ethylene glycol, a direct esterification reaction between terephthalic acid/isophthalic acid and ethylene glycol, or an esterification reaction between a glycol ester of terephthalic acid and/or a low polymer thereof and isophthalic acid. A polyester of interest can be obtained by carrying out a polycondensation reaction until a desired polymerization degree is achieved while this reaction product is heated under high vacuum to remove a glycol. The aromatic polyester obtained by the above method (melt polymerization) can be converted into a polymer having a higher polymerization degree by solid-phase polymerization as required.

In the present invention, to carry out the first-stage reaction for melt polymerization through an ester exchange reaction, an ester exchange reaction catalyst must be added during the reaction. The ester exchange reaction catalyst is generally a calcium compound, manganese compound, titanium compound or the like. A titanium compound which is soluble in the aromatic polyester is preferred because the amount of the catalyst can be minimized and the obtained aromatic polyester has excellent taste and flavor retention properties, though any one of the said compounds may be used. Also a titanium compound which is soluble in the aromatic polyester is advantageously used as a catalyst for a polycondensation reaction to obtain excellent resistance to hydrolysis and taste and flavor retention properties. Any titanium compound may be used, as exemplified by titanium compounds which are known as a polycondensation catalyst for polyesters, such as titanium acetate and titanium tetrabutoxide. To obtain good balance between taste and flavor retention properties and heat resistance, a titanium compound represented by the following formula (5):

$$\text{Ti(OR)}_4 \qquad (5)$$

wherein R is an alkyl group or phenyl group, with the proviso that four R's may be the same or different, or a titanium compound which is a reaction product of a compound represented by the above formula (5) and benzenepolycarboxylic acid represented by the following formula (6) or an acid anhydride thereof:

(6)

wherein n is 2, 3 or 4.

In the above formula (5), the four R's may be the same or different and each an alkyl group or phenyl group.

Preferred examples of the titanium tetraalkoxide represented by the above formula (5) include titanium tetraisopropoxide, titanium tetrapropoxide, titanium tetrabutoxide, titanium tetraethoxide and titanium tetraphenoxide. Preferred examples of the benzenepolycarboxylic acid represented by the above formula (6) or anhydride thereof to be reacted with the titanium compound include phthalic acid, trimellitic acid, hemimellitic acid, pyromellitic acid and anhydrides thereof. When the above titanium compound and benzenepolycarboxylic acid or anhydride thereof are to be reacted with each other, it is preferred that part of the benzenepolycarboxylic acid or anhydride thereof should be dissolved in a solvent and the titanium compound represented by the above formula (5) should be added dropwise to the solution and reacted at a temperature of 0 to 200° C. for 30 minutes or more.

The aromatic polyester of the present invention contains a titanium compound, preferably a titanium compound soluble in a polymer in an amount of 2 to 20 mmol % in terms of elemental titanium as represented by the above formula (3). The titanium compound is contained in an amount of preferably 4 to 20 mmol % as represented by the following formula (3)-1, particularly preferably 7 to 14 mmol %:

$$4 \leq Ti \leq 20 \quad (3)\text{-}1$$

wherein T is as defined in the above formula.

When the amount of elemental titanium is smaller than 2 mmol %, the productivity of the aromatic polyester lowers and an aromatic polyester having a targeted molecular weight cannot be obtained. When the amount of elemental titanium is lager than 20 mmol %, heat stability degrades and a reduction in molecular weight during film production becomes large, thereby making it impossible to obtain an aromatic polyester of interest. It can be understood that the amount of elemental titanium soluble in a polymer is the total amount of elemental titanium of a titanium compound used as an ester exchange reaction catalyst and elemental titanium of a titanium compound used as a polycondensation reaction catalyst when the first-stage reaction is an ester exchange reaction.

In the present invention, the total amount of alkali metal compounds, an antimony compound and a germanium compound contained in the aromatic polyester must be 3 ppm or less in terms of the total of elemental alkali metals, elemental antimony and elemental germanium. The total amount of elemental antimony and elemental germanium is preferably smaller than 1 ppm. The total amount of elemental alkali metals is the total amount (ppm) of elemental Li, Na and K determined by atomic absorption analysis. The amount of elemental antimony and the amount of elemental germanium are determined by fluorescent X-ray analysis. When the total amount of elemental alkali metals, elemental antimony metals and elemental germanium metals is larger than 3 ppm, taste and flavor retention properties, especially taste and flavor retention properties after a retort treatment deteriorate.

Although the aromatic polyester of the present invention is not limited by the production process thereof as described above, it is produced using a titanium compound as a catalyst and a phosphorus compound as a stabilizer both of which must satisfy either one or both of the following expressions (1) and (2):

$$0.1 \leq Ti/P < 3.0 \quad (1)$$

$$5 \leq Ti+P \leq 60 \quad (2)$$

wherein Ti is the amount (mmol %) of elemental titanium of the titanium compound contained in the aromatic polyester and P is the amount (mmol %) of elemental phosphorus of the phosphorus compound contained in the aromatic polyester.

The titanium compound and the phosphorus compound contained in the aromatic polyester preferably satisfy at least one of the following expressions (1)-1 and (2)-1:

$$0.3 \leq Ti/P \leq 2.5 \quad (1)\text{-}1$$

$$6 \leq Ti+P \leq 40 \quad (2)\text{-}1$$

wherein Ti and P are as defined hereinabove.

When (Ti/P) is smaller than 0.1, the polymerization reactivity of the polyester greatly lowers, thereby making it impossible to obtain an aromatic polyester of interest. When (Ti/P) is larger than 3.0, heat stability sharply degrades, thereby making it impossible to obtain an aromatic polyester of interest. In the aromatic polyester used in the present invention, the proper range of (Ti/P) is narrower than when a general metal catalyst is used. When (Ti/P) is in the proper range, the effect of the present invention which is not obtained in the prior art can be obtained. When (Ti+P) is smaller than 5, moldability and impact resistance are deteriorated by a great reduction in the productivity of a film formation process using a electrostatic impression method and a reduction in the thickness uniformity of the film, thereby making it impossible to obtain satisfactory performance. When (Ti+P) is larger than 60, the flavor retention properties of the aromatic polyester are degraded by a low molecular weight component of a polyester formed by interaction with the polyester, thereby making it impossible to obtain satisfactory performance. It can be understood that the "elemental phosphorus" is derived from the phosphorus compound used to deactivate the catalyst or used as a stabilizer for the polymer.

The amount of elemental phosphorus of the phosphorus compound contained in the aromatic polyester of the present invention and the amount of acetaldehyde contained in the film preferably satisfy the following expression (4):

$$0.3 \leq (AA+P)/Ti \leq 40 \quad (4)$$

wherein AA is the amount (mmol %) of acetaldehyde contained in the aromatic polyester and P and Ti are as defined hereinabove.

Within the range of the above formula (4), they more preferably satisfy a range of 0.3 to 30.

When the value of (AA+P)/Ti is smaller than 0.3, the activity of Ti may become high, thereby deteriorating heat resistance and resistance to hydrolysis. When the value of (AA+P)/Ti is larger than 40, taste and flavor retention properties may greatly degrade, thereby making it difficult to obtain an aromatic polyester film of interest.

The amount of acetaldehyde contained in the aromatic polyester film of the present invention is preferably 0.1 to 40 mmol %, more preferably 0.1 to 20 mmol %. When the amount is smaller than 0.1 mmol %, it is difficult to suppress the activity of titanium contained in the aromatic polyester and when the amount is larger than 30 mmol %, taste and flavor retention properties may greatly degrade disadvantageously.

The above "mmol %" is based on the total of all the dicarboxylic acid components of the aromatic polyester.

The intrinsic viscosity (o-chlorophenol, 35° C.) of the aromatic polyester in the present invention is in the range of preferably 0.50 to 0.80 dl/g, more preferably 0.55 to 0.75 dl/g, particularly preferably 0.60 to 0.70 dl/g. When the intrinsic viscosity is lower than 0.50 dl/g, the impact resistance of the film becomes unsatisfactory. When the intrinsic viscosity is higher than 0.80 dl/g, it is necessary to increase the intrinsic viscosity of the raw material polymer excessively, which is uneconomical.

The glass transition temperature (may be abbreviated as Tg hereinafter) of the aromatic polyester of the present invention is preferably 70° C. or more, particularly preferably 73° C. or more. When Tg is lower than 70° C., heat resistance lowers, resulting in the deteriorated taste and flavor retention properties of the film after a retort treatment. Tg of the film is obtained using Du Pont Instruments 910 DSC at a temperature elevation rate of 20° C./min by placing 20 mg of a sample in a DSC measurement pan, heating and melting at 290° C. for 5 minutes, and solidifying by quenching the sample pan on an aluminum foil placed on ice.

The melting point of the aromatic polyester in the preset invention is preferably 210 to 250° C., particularly preferably 215 to 245° C. When the melting point is lower than 210° C., the heat resistance of the film tends to lower and when the melting point is higher than 250° C., the crystallinity of the film becomes high, thereby impairing the moldability of the film. The melting point of the film is measured using Du Pont Instruments 910 DSC at a temperature elevation rate of 20° C./min to obtain a melting peak. The amount of the sample is 20 mg.

Further, the terminal carboxyl group concentration of the aromatic polyester in the present invention is preferably 40 eq/$10^6$ g or less, particularly preferably 35 eq/$10^6$ g or less. The terminal carboxyl group concentration can be obtained in accordance with the A. Conix method (Makromol. Chem. vol. 26, pp. 226, 1958).

When the film having excellent flatness of the present invention is to be obtained by employing an electrostatic impression method and laminated on a metal plate and molded into a metal can, the value of melt resistivity at 290° C. of the aromatic polyester is preferably set to $1 \times 10^6$ to $5 \times 10^8$ Ω·cm to obtain excellent lamination properties and moldability. When the value of melt resistivity is smaller than $1 \times 10^6$ Ω·cm, taste and flavor retention properties after can making deteriorate disadvantageously. When the value of melt resistivity is larger than $5 \times 10^8$ Ω·cm, the productivity of films is apt to drop and lamination properties and moldability are liable to deteriorate disadvantageously. The value of melt resistivity can be set to the above range by adjusting the ratio of acetaldehyde to the titanium compound and the phosphorus compound soluble in a polymer contained in the aromatic polyester to the above proper range of the present invention.

The film of the present invention comprises an aromatic polyester composition comprising the above aromatic polyester and inert fine particles (lubricant) having an average particle diameter of 2.5 μm or less. The average particle diameter of the inert fine particles is preferably 0.05 to 2.0 μm, more preferably 0.1 to 1.5 μm. When the average particle diameter is larger than 2.5 μm, pinholes are readily formed by molding. The average particle diameter of the inert fine particles is a value at a integrated 50% point in an equivalent sphere diameter distribution obtained using a centrifugal sedimentation particle size distribution measuring instrument. The content of the inert fine particles is 0.05 to 5.0 wt %, preferably 0.08 to 3.0 wt %, more preferably 0.1 to 1.0 wt %. When the content is lower than 0.05 wt %, the film winding properties become unsatisfactory, resulting in low productivity. When the content is higher than 5.0 wt %, pinholes are formed in the film by molding disadvantageously.

The inert fine particles of the present invention preferably consist of non-porous globular fine particles having a particle diameter ratio (long diameter/short diameter) of 1.0 to 1.2 or a combination of the globular fine particles and porous fine particles.

The non-porous globular fine particles have an average particle diameter of preferably 0.05 to 2.0 μm, more preferably 0.07 to 1.7 μm, much more preferably 0.08 to 1.5 μm. When the average particle diameter of the particles is smaller than 0.05 μm, the productivity of the film lowers and moldability degrades though the surface of the film becomes flat. When the average particle diameter is larger than 2.0 μm, pinholes are readily formed by molding, thereby making it difficult to obtain a satisfactory product disadvantageously. Examples of the non-porous globular fine particles include inorganic lubricants such as silica, alumina, titanium oxide, calcium carbonate and barium sulfate, and organic lubricants such as silicone resin fine particles and crosslinked polystyrene. Out of these, spherical silica, spherical silicone resin fine particles and globular crosslinked polystyrene are preferred and spherical silica is particularly preferred. The non-porous globular fine particles are not limited to the above externally added particles and internally deposited particles obtained by depositing part or all of the catalysts used for the production of the polyester in the reaction step may also be used. Both externally added particles and internally deposited particles may be used.

The average particle diameter of the porous fine particles is preferably 0.1 to 1.5 μm, particularly preferably 0.3 to 1.0 μm. The particle size distribution (d) of the porous fine particles is preferably 1.2 to 2.0, more preferably 1.3 to 1.9, particularly preferably 1.4 to 1.8. When the particle size distribution is smaller than 1.2, the particle diameter becomes relatively small with the result of a reduction in the productivity of the film and deterioration in deep drawability. When the particle size distribution is larger than 2.0, the number of large particles which may become coarse particles in the film increases relatively with the result of the formation of pinholes during molding and a reduction in impact resistance. The particle size distribution (d) is obtained from the ratio (D70/D30) of the particle diameter (D70) of 70% of the integrated number of particles (in terms of volume) to the particle diameter (D30) of 30% of the integrated number of particles read from a particle size distribution obtained by a laser diffusion type particle size distribution measuring instrument. The pore volume of the porous particles is in the range of preferably 0.05 to 2.5 ml/g, more preferably 0.1 to 2.0 ml/g, much more preferably 0.5 to 1.8 ml/g. When the pore volume is smaller than 0.05 ml/g, the porous particles have low affinity for the film, thereby frequently causing the breakage of the film during molding. When the pore volume is larger than 2.5 ml/g, the porous particles are ground during molding and some of the particles are easily contained in a drink, thereby deteriorating taste and flavor retention properties disadvantageously. The pore volume is measured by the mercury-helium method. The specific surface area of the porous fine particles is preferably 50 to 600 m$^2$/g, more preferably 150 to 450 m$^2$/g. When the specific surface area of the particles is smaller than 50 m$^2$/g, pinhole resistance at the time of high deformation may deteriorate and when the specific surface area is larger than 600 m$^2$/g, the heat resistance of the polyester may degrade due to the high surface activity of the particles. Further, the compressive resistance of the porous fine particles is preferably 1 to 100 MPa, more preferably 5 to 50 MPa. When the compressive resistance is higher than 100 MPa, the particles themselves chip the film during molding, whereby the impact resistance and corrosion resistance of the film are easily reduced. The compressive resistance of the particles is defined as follows. A load is applied to each particle by a micro-compression tester while the particle is observed through a microscope to obtain a load when the particle is broken, this operation is made on at least 10 particles, and the mean value of the measurement data is taken as compressive resistance. The primary particle constituting the porous fine particles is not particularly limited, as exemplified by inorganic particles such as colloidal silica, titanium oxide, calcium carbonate, calcium phosphate, barium sulfate, alumina, zirconia, kaolin, composite oxide particles, and organic particles such as crosslinked polystyrene, acrylic crosslinked particle, methacrylic crosslinked particle and silicone particle. The porous fine particles have a hydroxyl value of preferably 300 mgKOH/g or less, more preferably 200 mgKOH/g or less. When the hydroxyl value is larger than 300 mgKOH/g, agglomerated coarse particles may be formed by interaction between particles and heat stability may be degraded by interaction between the particles and the polyester due to the high surface activity of the particles.

When the inert fine particles (B) consist of non-porous globular fine particles, the amount of the non-porous globular fine particles is preferably 0.08 to 3.0 wt %. When the inert fine particles (B) consist of a combination of non-porous globular fine particles and porous fine particles, the amount of the non-porous globular fine particles is preferably 0.01 to 0.5 wt % and the amount of the porous fine particles is preferably 0.01 to 0.7 wt %.

It is extremely preferred for the acquisition of good balance among high deep drawability, film productivity and taste and flavor retention properties that the average particle diameter of the non-porous globular fine particles should be smaller than the average particle diameter of the porous fine particles and in the range of 0.08 to 1.5 μm.

The method of containing the inert fine particles in the aromatic polyester in the present invention is not particularly limited. For instance, the inert fine particles may be added in any stage of the polyester production process.

Additives such as an antioxidant, heat stabilizer, viscosity control agent, plasticizer, color modifier, nucleating agent and ultraviolet light absorber may be added to the aromatic polyester as required.

The film of the present invention is used in the form of a biaxially oriented film by stretching biaxially and optionally heat setting. More specifically, sequential biaxial stretching will be described hereinbelow. The film of the present invention is obtained as follows. The aromatic polyester is molten, extruded from a dice, laminated to be bonded before solidification and quenched immediately to obtain a substantially amorphous polyester sheet. This sheet is then heated by a roll or infrared rays to be stretched in a longitudinal direction. Preferably, the stretching temperature at this point is 20 to 40° C. higher than the glass transition point (Tg) of the aromatic polyester and the draw ratio is 2.7 to 3.6 times. Preferably, the stretched sheet is then stretched in a transverse direction by elevating the temperature from a temperature 20° C. or more higher than Tg to a temperature 100 to 130° C. lower than the melting point (Tm) of the aromatic polyester. The draw ratio in the transverse direction is preferably 2.8 to 3.7 times. The heat setting temperature is selected from a range of 150 to 205° C. according to the melting point of the aromatic polyester so as to control the quality of the film.

The biaxially oriented film of the present invention preferably contains coarse particles having a particle diameter of 20 μm or more at a density of not more than 10/mm$^2$. The coarse particles are agglomerates of the above porous fine particles. When the density of the coarse particles having a particle size of 20 μm or more is higher than 10/mm$^2$, pinholes are formed during molding disadvantageously. The film of the present invention preferably contains porous fine particles having a particle size distribution of 1.2 to 2.0, an average particle diameter of 0.1 to 2.5 μm, a pore volume of 0.05 to 2.5 ml/g, a specific surface area of 50 to 600 m$^2$/g and a compressive resistance of 1 to 100 MPa in an amount of 0.01 to 0.7 wt %.

The refractive index in the thickness direction of the biaxially oriented film of the present invention is preferably 1.500 to 1.540, more preferably 1.505 to 1.530. When the refractive index is too low, moldability becomes unsatisfactory and when the refractive index is too high, the film becomes almost amorphous in structure with the result that heat resistance may lower.

The center line average surface roughness (Ra) of a surface of the biaxially oriented polyester film of the present invention is preferably 30 nm or less, more preferably 25 nm or less, particularly preferably 20 nm or less.

The thickness of the biaxially oriented film of the present invention is preferably 6 to 75 μm, more preferably 8 to 75 μm, particularly preferably 10 to 50 μm. When the thickness is smaller than 6 μm, the film is readily broken by molding and when the thickness is larger than 75 μm, the film has excess quality uneconomically.

Since the biaxially oriented polyester film of the present invention is advantageously used in food cans or drink cans, it is preferred that the amounts of substances eluting or scattered from the film should be as small as possible. However, it is substantially impossible to eliminate the substances. Then, in order to use the biaxially oriented polyester film of the present invention for food cans or drink cans, the extraction per 1 cm$^2$ of the film when it is treated with ion exchange water at 121° C. for 2 hours is preferably 0.08 mg or less, more preferably 0.02 mg or less. To reduce the above extraction, it is advantageous to increase the glass transition temperature of the film. The glass transition temperature of the film is determined by the glass transition temperature and the orientation degree of a polymer forming the film. Since moldability is lowered by increasing the orientation degree, the glass transition temperature of the polymer (co-PET) is preferably increased.

The metal plate to be laminated with the biaxially oriented polyester film of the present intention, particularly the metal plate for making cans is suitably selected from tin, tin-free steel and aluminum plates. The polyester film may be laminated on the metal plate by the following methods (1) and (2).

(1) The metal plate is heated at a temperature higher than the melting point of the film, laminated with the film, cooled and bonded to the film by making amorphous the surface layer (thin layer portion) of the film in contact with the metal plate.

(2) A primer coat is applied to the film to form an adhesive layer and this adhesive layer is laminated on the metal plate. The adhesive layer is made from a known resin adhesive such as an epoxy-based adhesive, epoxy-ester-based adhesive or alkyd-based adhesive.

Further, another additional layer may be optionally formed on one side or both sides of the polyester film of the present invention.

EXAMPLES

The following examples are given to further illustrate the present invention. The characteristic properties of the film were measured and evaluated by the following methods.

(1) Intrinsic Viscosity (IV) of Polyester

This was measured in orthochlorophenol at 35° C.

(2) Melting Point (Tm) of Polyester

This was measured by obtaining a melting peak at a temperature elevation rate of 20° C./min using Du Pont Instruments 910 DSC. The amount of the sample was 20 mg.

(3) Glass Transition Temperature (Tg)

20 mg of the sample was placed in a DSC measurement pan, molten by heating the pan on a stage at 290° C. for 5 minutes and solidified by quenching it on an aluminum foil placed on ice, and the glass transition point of the sample was measured at a temperature elevation rate of 20° C./min using Du Pont Instruments 910 DSC.

(4) Terminal Carboxyl Group Concentration (eq/$10^6$ g)

This was measured in accordance with the A. Conix method (Makromal. Chem. vol. 26, pp. 226, 1958).

(5) Amount of Acetaldehyde

The amount of acetaldehyde generated when the film was heated at 160° C. for 20 minutes was determined by gas chromatography.

(6) Melt Resistivity of Polymer

This was measured in accordance with the method described in British. J. Appl. Phys., vol. 17, pp. 1149–1154, 1966. The sample was molten at 290° C. and 1,000 V DC was applied to the sample to obtain a stabilized measured value as a melt resistivity value.

(7) Average Particle Diameter of Lubricant (Inert Fine Particles)

The diameter at a 50% integrated volume fraction in an equivalent sphere diameter distribution measured by a centrifugal sedimentation type particle size distribution measuring instrument was taken as average particle diameter.

(8) Particle Size Distribution of Porous Fine Particles

The ratio of the particle diameter (D70) of 70% (in terms of volume) of the integrated number of particles to the particle diameter (D30) of 30% of the integrated number of particles was obtained from an integrated particle size distribution measured by a laser diffusion type particle size distribution measuring instrument (SALD2000 of Shimadzu Corporation) and taken as the particle size distribution (d) of the porous fine particles.

$$d=D70/D30$$

(9) Pore Volume

The pore volume of the powder was obtained from the adsorption of nitrogen at a relative pressure of 0.998 measured by the constant delivery method using the Autosobe-1 of Kantachrome Co., Ltd. based on the assumption that pores of the powder were all filled with nitrogen.

(10) Specific Surface Area

The adsorption of nitrogen at a relative pressure of 0.3 was measured by the constant delivery method using the Autosobe-1 of Kantachrome Co., Ltd. like the pore volume to obtain the specific surface area of the powder by the B.E.T1 point method. In the present invention, the specific surface area is defined as the total surface area per unit weight of the powder.

(11) Compressive Resistance

A load was applied to the particle at a fixed speed for each load range using the MCTM-201 micro-compression tester of Shimadzu Corporation while the particle was observed through a microscope (loading speed of 3 mg/sec for a load of 0.01 to 0.2 g: 29 mg/sec for 0.2 to 2 g: 270 mg/sec for 2 to 20 g: 1,440 mg/sec for 20 to 200 g), the load at breakage was taken as compressive resistance, this operation was made on at least 100 particles, and the mean value of the measurement data was taken as average compressive resistance.

(12) Hydroxyl Value

The hydroxyl group contained in the fine particle powder was acetylated with acetic anhydride, a predetermined amount of di-n-butylamine was added to this to acetylate excessive acetic anhydride, and the residual di-n-butylamine was titrated with HCl to obtain the amount of acetic anhydride consumed by the hydroxyl group so as to obtain the hydroxyl value from the following expression (reference document: J. Pharm. Sci., vol. 66, pp. 273, 1977).

hydroxyl value (mgKOH/g)=((A–B)×F)/S

A: consumption of an N/2 HCl solution in real test (ml)
    B: consumption of an N/2 HCl solution in blank test (ml)
    F: strength of an N/2 HCl solution (KOHmg/ml)
    S: amount of the sample (g)

(13) Measurement of Coarse Particles

The surface of the film was etched and a 1 $mm^2$ area of the etched surface was observed with the S-2150 transmission type electron microscope of Hitachi, Ltd. to count the number of particles having the maximum length of 20 μm or more from the image of each particle (per $mm^2$).

(14) Film Surface Roughness (Ra)

This was measured using the SURFCORDER SE-30C tracer surface roughness meter of Kosaka Kenkyusho Co., Ltd. at a tracer radius of 2 μm, a measurement pressure of 0.03 g and a cut-off value of 0.25 mm.

(15) Refractive Index in Thickness Direction

This was measured with monochromatic and-rays at a measurement temperature of 25° C. using methylene iodide as a mount solution by attaching a polarizing analyzer to the eyepiece side of an Abbe refractometer.

(16) Amount of Alkali Metal

The film sample was dissolved in o-chlorophenol and subjected to an extraction operation with 0.5 N hydrochloric acid. The amounts of Na, K and Li contained in the obtained extract were determined by the Z-6100 polarization Zeeman atomic absorption photometer of Hitachi, Ltd. and totaled as the total amount of alkali metals.

(17) Amounts of Elemental Titanium Metal, Germanium Metal, Antimony Metal and Phosphorus The film sample was molten by heating at 240° C. to form a circular disk and the amounts of elemental catalytic metals and elemental phosphorus were determined by the 3270 fluorescent X-ray device of Rikaku Co., Ltd.

(18) Amount of Diethylene Glycol

The film was dissolved in a mixed solvent of $CDCl_3$ and $CF_3COOD$ and the amount of diethylene glycol was measured by $^1$H-NMR.

(19) Resistance to Hydrolysis

The film was immersed in a container filled with ion exchange water and kept at 70° C. for 30 days. A reduction in molecular weight was evaluated by the above-described measurement of intrinsic viscosity.

◯: IV reduction is 0.04 or more.

Δ: IV reduction is more than 0.04 and less than 0.10.

X: IV reduction is 0.10 or more.

(20) Lamination Properties

The film was laminated on a 0.25 mm thick tin-free steel plate heated at a temperature higher than the melting point of the copolyester and cooled to obtain a steel covered plate. This steel covered plate was observed to evaluate lamination properties based on the following criteria. criteria for air bubbles and wrinkles (lamination property A)

○: no air bubbles and wrinkles are seen

Δ: 2 to 3 air bubbles and wrinkles are seen per a length of 10 cm

X: many air bubbles and wrinkles are seen criteria for heat shrinkage factor (lamination property B)

○: shrinkage factor is smaller than 2%

Δ: shrinkage factor is 2% or more and less than 5%

X: shrinkage factor is 5% or more

(21) deep drawability-1

A tin-free steel plate laminated with the film in the same manner as in (20) above was cut into a 150 mm-diameter disk-like product. The disk-like product was deep drawn using a drawing dice and punch in four stages to form a 55 mm-diameter container without a seam joint on the side (to be called "can" hereinafter). This can was observed and evaluated based on the following criteria.

○: The film is not abnormal and the molded film is not whitened or broken.

Δ: A top portion of the film of the can is whitened.

X: The film is partially broken.

(22) Deep Drawability-2

The can obtained in (21) above was observed, tested and evaluated based on the following criteria.

○: The film is molded properly and exhibits a current value of 0.2 mA or less in a corrosion prevention test on the film formed on the interior side of the can (The current value is measured when the can is filled with a 1% NaCl aqueous solution, electrodes are inserted into the can, and 6V is applied with the can as an anode. This test is referred to as "ERV test" hereinafter.).

X: The film is not abnormal but exhibits a current value of more than 0.2 mA in the ERV test. When an energized portion of the film is magnified for observation, a pinhole-like crack starting from the coarse particle of the film is observed.

(23) Deep Drawability-3

The can obtained in (21) above was observed, tested and evaluated based on the following criteria.

○: The film is molded properly and exhibits a current value of 0.15 mA or less in a corrosion prevention test on the film formed on the interior side of the can.

X: The film is not abnormal but exhibits a current value of 0.15 mA or more in the ERV test. When an energized portion of the film is magnified for observation, a pinhole-like crack starting from the coarse particle of the film is observed.

(24) Impact Resistance 10 well deeply drawn cans were filled with water, cooled to 0° C., and dropped onto a vinyl chloride tiled floor from a height of 30 cm at each time. Thereafter, an ERV test was made on the cans which were then evaluated based on the following criteria.

○: The films of all the 10 cans exhibit a current value of 0.2 mA or less.

Δ: The films of 1 to 5 cans exhibit a current value of more than 0.2 mA.

X: The films of 6 or more cans exhibit a current value of more than 0.2 mA or cracked after dropping.

(25) Resistance to Heat Embrittlement

Well deeply drawn cans were heated at 200° C. for 5 minutes and evaluated for impact resistance described above based on the following criteria.

○: The films of all the 10 cans exhibit a current value of 0.2 mA or less.

Δ: The films of 1 to 5 cans exhibit a current value of more than 0.2 mA.

X: The films of 6 or more cans exhibit a current value of more than 0.2 mA or cracked after being heated at 200° C. for 5 minutes.

(26) Retort Resistance

Well deeply drawn cans were filled with water, subjected to 1 hour of a retort treatment at 120° C. using a steam sterilizer and kept at 55° C. for 60 days. 10 of the cans were then dropped onto a vinyl chloride tiled floor from a height of 50 cm at each time and an ERV test was made on the inside of each can to evaluate its retort resistance based on the following criteria.

○: The films of all the 10 cans exhibit a current value of 0.2 mA or less.

Δ: The films of 1 to 5 cans exhibit a current value of more than 0.2 mA.

X: The films of 6 or more cans exhibit a current value of more than 0.2 mA or cracked after dropping.

(27) Taste and Flavor Retention Property-1

Well deeply drawn cans were filled with ion exchange water and kept at normal temperature (20° C.) for a predetermine period of time. A drink test was made on 30 people using the ion exchange water to be compared with ion exchange water as reference. The taste and flavor retention properties of the film were evaluated based on the following criteria. The predetermined period of time was 60 days (taste and flavor retention property-1a) or 90 days (taste and flavor retention property-1b).

◎: 3 or less out of 30 people feel changes in taste and flavor compared with the reference solution.

○: 4 to 6 out of 30 people feel changes in taste and flavor compared with the reference solution.

Δ: 7 to 9 out of 30 people feel changes in taste and flavor compared with the reference solution.

X: 10 or more out of 30 people feel changes in taste and flavor compared with the reference solution.

(28) Taste and Flavor Retention Property-2

Well deeply drawn cans were filled with ion exchange water, subjected to a retort treatment in a steam sterilizer at 125° C. for 1 hour and kept at normal temperature (20° C.) for a predetermined period of time. A drink test was made on 30 people using the ion exchange water to be compared with ion exchange water as reference. The taste and flavor retention properties of the film were evaluated based on the following criteria. The predetermined period of time was 60 days (taste and flavor retention property-2a) or 90 days (taste and flavor retention property-2b).

◎: 3 or less out of 30 people feel changes in taste and flavor compared with the reference solution.

○: 4 to 6 out of 30 people feel changes in taste and flavor compared with the reference solution.

Δ: 7 to 9 out of 30 people feel changes in taste and flavor compared with the reference solution.

X: 10 or more out of 30 people feel changes in taste and flavor compared with the reference solution.

The following abbreviations in the tables below stand for the following.

TA: terephthalic acid
NDC: 2,6-naphthalenedicarboxylic acid
IA: isophthalic acid
DEG: diethylene glycol
TBT: tetrabuthoxytitanium
TMA: trimellitic acid
GeO$_2$: germanium dioxide
Sb$_2$O$_3$: antimony trioxide
Ak: total amount of elemental alkali metals contained in polyester
Ti: amount of elemental titanium catalyst metal contained in polyester
Ge: amount of elemental germanium catalyst metal contained in polyester Table 1, the metal contents of each film are shown in Table 2, and the evaluation results of each film are shown in Tables 3 and 4.

A mixed catalyst of TBT (tetrabuthoxytitanium) and TMA (trimellitic acid) used in Example 5 was prepared as follows. Tetrabuthoxytitanium was added to an ethylene glycol solution of trimellitic anhydride (0.2%) in such an amount of 1/2 mol based on trimellitic anhydride and kept in the air at 80° C. under normal pressure to carry out a reaction for 60 minutes. Thereafter, the reaction product was cooled to normal temperature, the formed catalyst was recrystallized with acetone 10 times as much as the catalyst, and the precipitate was filtered with a filter and dried at 100° C. for 2 hours to obtain a catalyst of interest.

TABLE 1

| | characteristic properties of polymer | | | | characteristic properties of film | | | | |
|---|---|---|---|---|---|---|---|---|---|
| | dicarboxylic acid component | DEG component | polycondensation catalyst | | IV | Tg | Tm | COOH | nz |
| | (mol %) (mol %) | (mol %) | | | (dl/g) | (° C.) | (° C.) | (eq/10$^6$ g) | (-) |
| Ex.1 | TA(90) NDC(10) | 1.5 | TBT | | 0.70 | 81 | 232 | 33 | 1.523 |
| Ex.2 | TA(82) NDC(18) | 1.5 | TBT | | 0.70 | 83 | 213 | 33 | 1.525 |
| Ex.3 | TA(90) IA(10) | 1.5 | TBT | | 0.70 | 74 | 232 | 33 | 1.520 |
| Ex.4 | TA(90) IA(10) | 1.5 | TBT | | 0.70 | 74 | 232 | 33 | 1.520 |
| Ex.5 | TA(90) IA(10) | 1.5 | TBT + TMA | | 0.70 | 74 | 232 | 31 | 1.520 |
| C.Ex.1 | TA(90) NDC(10) | 1.0 | Sb$_2$O$_3$ | | 0.70 | 82 | 234 | 33 | 1.523 |
| C.Ex.2 | TA(90) NDC(10) | 1.5 | GeO$_2$ | | 0.70 | 81 | 232 | 33 | 1.523 |
| C.Ex.3 | TA(90) NDC(10) | 1.5 | TBT | | 0.70 | 81 | 232 | 33 | 1.523 |
| C.Ex.4 | TA(90) NDC(10) | 1.5 | TBT | | 0.70 | 81 | 232 | 33 | 1.523 |
| C.Ex.5 | TA(90) NDC(10) | 1.5 | TBT | | 0.70 | 81 | 232 | 33 | 1.523 |

Ex.: Example
C.Ex.: Comparative Example

Sb: amount of elemental antimony catalyst metal contained in polyester
P: amount of elemental phosphorus contained in polyester
AA: amount of acetaldehyde contained in polyester
Tg: glass transition temperature
Tm: melting point
IV: intrinsic viscosity:
COOH: terminal carboxyl group concentration
nz: refractive index in thickness direction
Ra: center line average surface roughness Examples 1 to 5 and Comparative Examples 1 to 5

Copolyethylene terephthalate (containing 0.1 wt % of globular silica particles having a particle diameter ratio of 1.09 and an average particle diameter of 0.5 μm) obtained using acid components, diethylene glycol, ethylene glycol and polymerization catalyst shown in Table 1 to ensure that the metal contents of the film became values shown in Table 2 was dried, melt extruded at 280° C. and solidified by quenching to obtain an unstretched film. Thereafter, this unstretched film was stretched to 3.0 times in a longitudinal direction at 110° C. and 3.0 times in a transverse direction at 120° C. and heat set at 180° C. to obtain a biaxially oriented film. The thickness of each obtained film was 25 μm. The characteristic properties of each film are shown in

TABLE 2

| | metal contents of film | | | | | | |
|---|---|---|---|---|---|---|---|
| | Ti (mmol %) | P (mmol %) | Ak (ppm) | Ge (ppm) | Sb (ppm) | Ti/P | Ti + P |
| Ex.1 | 12 | 20 | 3 | 0 | 0 | 0.6 | 32 |
| Ex.2 | 12 | 20 | 3 | 0 | 0 | 0.6 | 32 |
| Ex.3 | 12 | 20 | 3 | 0 | 0 | 0.6 | 32 |
| Ex.4 | 10 | 25 | 3 | 0 | 0 | 0.4 | 35 |
| Ex.5 | 12 | 20 | 3 | 0 | 0 | 0.6 | 32 |
| C.Ex.1 | 0 | 40 | 3 | 0 | 253 | 0.0 | 40 |
| C.Ex.2 | 0 | 35 | 3 | 113 | 0 | 0.0 | 35 |
| C.Ex.3 | 25 | 15 | 3 | 0 | 0 | 1.7 | 40 |
| C.Ex.4 | 18 | 5 | 3 | 0 | 0 | 3.6 | 23 |
| C.Ex.5 | 12 | 20 | 3 | 15 | 38 | 0.6 | 32 |

Ex.: Example
C.Ex.: Comparative Example

TABLE 3

| | resistance to hydrolysis | lamination properties | | deep drawability | |
|---|---|---|---|---|---|
| | | A | B | 1 | 2 |
| Ex. 1 | ○ | ○ | ○ | ○ | ○ |
| Ex. 2 | ○ | ○ | ○ | ○ | ○ |
| Ex. 3 | ○ | ○ | ○ | ○ | ○ |
| Ex. 4 | ○ | ○ | ○ | ○ | ○ |
| Ex. 5 | ○ | ○ | ○ | ○ | ○ |

TABLE 3-continued

| | resistance to hydrolysis | lamination properties A | lamination properties B | deep drawability 1 | deep drawability 2 |
|---|---|---|---|---|---|
| C. Ex. 1 | ○ | ○ | ○ | ○ | ○ |
| C. Ex. 2 | ○ | ○ | ○ | ○ | ○ |
| C. Ex. 3 | Δ | ○ | ○ | ○ | ○ |
| C. Ex. 4 | Δ | ○ | ○ | ○ | ○ |
| C. Ex. 5 | ○ | ○ | ○ | ○ | ○ |

Ex.: Example
C. Ex.: Comparative Example

TABLE 4

| | impact resistance | resistance to heat embrittlement | retort resistance | taste and flavor retention properties 1a | taste and flavor retention properties 2a |
|---|---|---|---|---|---|
| Ex. 1 | ○ | ○ | ○ | ○ | ○ |
| Ex. 2 | ○ | ○ | ○ | ○ | ○ |
| Ex. 3 | ○ | ○ | ○ | ○ | ○ |
| Ex. 4 | ○ | ○ | ○ | ○ | ○ |
| Ex. 5 | ○ | ○ | ○ | ○ | ○ |
| C. Ex. 1 | ○ | ○ | ○ | Δ | Δ |
| C. Ex. 2 | ○ | ○ | Δ | ○ | Δ |
| C. Ex. 3 | ○ | Δ | Δ | ○ | Δ |
| C. Ex. 4 | ○ | Δ | X | Δ | Δ |
| C. Ex. 5 | ○ | ○ | Δ | ○ | Δ |

Ex.: Example
C. Ex.: Comparative Example

TABLE 5

| | characteristic properties of polymer | | | | |
|---|---|---|---|---|---|
| | dicarboxylic acid component (mol %) | | DEG component (mol %) | poly-condensation catalyst | melt resistivity (MΩ·cm) |
| Ex. 6 | TA(90) | NDC(10) | 1.5 | TBT | 65 |
| Ex. 7 | TA(82) | NDC(18) | 1.5 | TBT | 55 |
| Ex. 8 | TA(90) | IA(10) | 1.5 | TBT | 50 |
| C. Ex. 6 | TA(90) | IA(10) | 1.5 | TBT | 45 |
| C. Ex. 7 | TA(90) | IA(10) | 1.5 | TBT | 40 |
| C. Ex. 8 | TA(90) | IA(10) | 1.0 | $Sb_2O_3$ | 45 |

Ex.: Example
C. Ex.: Comparative Example

TABLE 6

| | characteristic properties of film | | | | | |
|---|---|---|---|---|---|---|
| | IV (dl/g) | Tg (°C.) | Tm (°C.) | COOH (eq/$10^6$ g) | nz (−) | AA (mmol %) |
| Ex. 6 | 0.70 | 81 | 232 | 33 | 1.523 | 7 |
| Ex. 7 | 0.70 | 83 | 213 | 33 | 1.525 | 4 |
| Ex. 8 | 0.70 | 74 | 232 | 33 | 1.520 | 13 |
| C. Ex. 6 | 0.70 | 74 | 232 | 38 | 1.520 | 0 |
| C. Ex. 7 | 0.70 | 74 | 232 | 33 | 1.520 | 4 |
| C. Ex. 8 | 0.70 | 75 | 234 | 31 | 1.520 | 4 |

Ex.: Example
C. Ex.: Comparative Example

TABLE 7

| | metal contents of film | | | | | | | |
|---|---|---|---|---|---|---|---|---|
| | Ti (mmol %) | P (mmol %) | Ak (ppm) | Ge (ppm) | Sb (ppm) | Ti/P | Ti + P | (AA + P)/Ti |
| Ex.6 | 4 | 12 | 1 | 0 | 0 | 0.3 | 16 | 4.7 |
| Ex.7 | 8 | 19 | 1 | 0 | 0 | 0.5 | 27 | 2.9 |
| Ex.8 | 14 | 19 | 1 | 0 | 0 | 0.7 | 33 | 2.3 |
| C.Ex.6 | 20 | 4 | 1 | 0 | 0 | 5.0 | 24 | 0.2 |
| C.Ex.7 | 8 | 12 | 1 | 10 | 10 | 0.7 | 20 | 2.1 |
| C.Ex.8 | 0 | 12 | 1 | 0 | 150 | 0.0 | 12 | — |

Ex.: Example
C.Ex.: Comparative Example

Examples 6 to 8 and Comparative Examples 6 to 8

Copolyethylene terephthalate (containing 0.3 wt % of globular silica particles having a particle diameter ratio of 1.09 and an average particle diameter of 0.5 μm) obtained using components, catalyst and ethylene glycol shown in Table 5 was dried, melt extruded at 280° C. and solidified by quenching to obtain an unstretched film. Thereafter, this unstretched film was stretched to 3.0 times in a longitudinal direction at 110° C. and 3.0 times in a transverse direction at 120° C. and heat set at 180° C. to obtain a biaxially oriented film. The thickness of each obtained film was 25 μm. The characteristic properties of each film are shown in Table 6, the metal contents of each film are shown in Table 7 and the evaluation results of each film are shown in Tables 10 and 11.

Examples 9 to 12

As shown in Table 8, copolyethylene terephthalate similar to that of Example 6 except melt resistivity, total content of alkali metals, Ti/P value, Ti+P value and (AA+P)/Ti value was polymerized to obtain a biaxially oriented polyester film. The metal contents of the film are shown in Table 9 and the evaluation results are shown in Table 10 and Table 11.

TABLE 8

| | characteristic properties of polymer melt resistivity (MΩ·cm) | characteristic properties of film AA (mmol %) |
|---|---|---|
| Ex. 9 | 60 | 7 |
| Ex. 10 | 55 | 7 |

TABLE 8-continued

| | characteristic properties of polymer melt resistivity (MΩ · cm) | characteristic properties of film AA (mmol %) |
|---|---|---|
| Ex. 11 | 50 | 7 |
| Ex. 12 | 80 | 7 |

Ex.: Example

TABLE 9

| | metal contents of film | | | | | | | |
|---|---|---|---|---|---|---|---|---|
| | Ti (mmol %) | P (mmol %) | Ak (ppm) | Ge (ppm) | Sb (ppm) | Ti/P | Ti + P | (AA + P)/Ti |
| Ex.9 | 4 | 19 | 1 | 0 | 0 | 0.2 | 23 | 6.5 |
| Ex.10 | 4 | 9 | 3 | 0 | 0 | 0.4 | 13 | 4.0 |
| Ex.11 | 4 | 3 | 3 | 0 | 0 | 1.3 | 7 | 2.5 |
| Ex.12 | 4 | 9 | 0 | 0 | 0 | 0.4 | 13 | 4.0 |

Ex.: Example

TABLE 10

| | resistance to hydrolysis | lamination properties A | lamination properties B | deep drawability 1 | deep drawability 2 |
|---|---|---|---|---|---|
| Ex. 6 | ○ | ○ | ○ | ○ | ○ |
| Ex. 7 | ○ | ○ | ○ | ○ | ○ |
| Ex. 8 | ○ | ○ | ○ | ○ | ○ |
| Ex. 9 | ○ | ○ | ○ | ○ | ○ |
| Ex. 10 | ○ | ○ | ○ | ○ | ○ |
| Ex. 11 | ○ | ○ | ○ | ○ | ○ |
| Ex. 12 | ○ | ○ | ○ | ○ | ○ |
| C. Ex. 6 | Δ | ○ | ○ | ○ | ○ |
| C. Ex. 7 | Δ | ○ | ○ | ○ | ○ |
| C. Ex. 8 | ○ | ○ | ○ | ○ | ○ |

Ex.: Example
C. Ex.: Comparative Example

TABLE 11

| | impact resistance | resistance to heat embrittlement | retort resistance | taste and flavor retention properties 1a | taste and flavor retention properties 2a |
|---|---|---|---|---|---|
| Ex. 6 | ○ | ○ | ○ | ◎ | ◎ |
| Ex. 7 | ○ | ○ | ○ | ◎ | ◎ |
| Ex. 8 | ○ | ○ | ○ | ◎ | ○ |
| Ex. 9 | ○ | ○ | ○ | ◎ | ◎ |
| Ex. 10 | ○ | ○ | ○ | ◎ | ◎ |
| Ex. 11 | ○ | ○ | ○ | ◎ | ◎ |
| Ex. 12 | ○ | ○ | ○ | ◎ | ◎ |
| C. Ex. 6 | ○ | Δ | Δ | Δ | Δ |
| C. Ex. 7 | ○ | ○ | ○ | ○ | Δ |
| C. Ex. 8 | ○ | ○ | ○ | Δ | Δ |

Ex.: Example
C. Ex.: Comparative Example

Examples 13 to 15 and Comparative Examples 9 and 10

Copolyethylene terephthalate (containing 0.1 wt % of porous silica particles having an average particle diameter of 0.7 μm, a particle size distribution of 1.4, a pore volume of 1.5 ml/g, a specific surface area of 200 m²/g and a compressive resistance of 20 MPa and 0.1 wt % of globular silica particles having a particle diameter ratio of 1.09 and an average particle diameter of 0.3 μm) obtained using acid components, diethylene glycol, ethylene glycol and a polymerization catalyst shown in Table 12 to ensure that the metal contents of the film became values shown in Table 13 was dried, melt extruded at 280° C. and solidified by quenching to obtain an unstretched film. Thereafter, this unstretched film was stretched to 3.0 times in a longitudinal direction at 110° C. and 3.0 times in a transverse direction at 120° C. and heat set at 180° C. to obtain a biaxially oriented film. Each of the obtained films had a thickness of 25 μm and a surface roughness of 12 nm and contained 3 agglomerates of porous silica particles having a particle diameter of 20 μm or more per mm². The characteristic properties of each film are shown in Table 12 and the evaluation results of each film are shown in Tables 14 and 15.

TABLE 12

| | characteristic properties of polymer | | | | characteristic properties of film | | | | |
|---|---|---|---|---|---|---|---|---|---|
| | dicarboxylic acid component | DEG component | | polycondensation catalyst | IV | Tg | Tm | COOH | nz |
| | (mol %) (mol %) | (mol %) | | | (dl/g) | (° C.) | (° C.) | (eq/$10^6$ g) | (-) |
| Ex.13 | TA(90) IA(10) | 1.5 | | TBT | 0.70 | 74 | 232 | 33 | 1.520 |
| Ex.14 | TA(85) IA(15) | 1.5 | | TBT | 0.70 | 72 | 220 | 33 | 1.520 |
| Ex.15 | TA(90) NDC(10) | 1.5 | | TBT | 0.70 | 81 | 232 | 33 | 1.523 |
| C.Ex.9 | TA(90) IA(10) | 1.5 | | TBT | 0.70 | 74 | 232 | 33 | 1.520 |
| C.Ex.10 | TA(90) IA(10) | 1.5 | | $Sb_2O_3$ | 0.70 | 74 | 232 | 32 | 1.520 |

Ex.: Example
C.Ex.: Comparative Example

TABLE 13

| | metal contents of film | | | | | | |
|---|---|---|---|---|---|---|---|
| | Ti (mmol %) | P (mmol %) | Ak (ppm) | Ge (ppm) | Sb (ppm) | Ti/P | Ti + P |
| Ex.13 | 12 | 20 | 3 | 0 | 0 | 0.6 | 32 |
| Ex.14 | 12 | 20 | 3 | 0 | 0 | 0.6 | 32 |
| Ex.15 | 12 | 20 | 3 | 0 | 0 | 0.6 | 32 |
| C.Ex.9 | 25 | 25 | 3 | 0 | 0 | 1.0 | 50 |
| C.Ex.10 | 0 | 20 | 3 | 0 | 380 | 0.0 | 20 |

Ex.: Example
C.Ex.: Comparative Example

TABLE 14

| | resistance to hydrolysis | lamination properties A | lamination properties B | deep drawability 1 | deep drawability 2 | impact resistance |
|---|---|---|---|---|---|---|
| Ex. 13 | ○ | ○ | ○ | ○ | ○ | ○ |
| Ex. 14 | ○ | ○ | ○ | ○ | ○ | ○ |
| Ex. 15 | ○ | ○ | ○ | ○ | ○ | ○ |
| C. Ex. 9 | Δ | ○ | ○ | ○ | ○ | ○ |
| C. Ex. 10 | ○ | ○ | ○ | ○ | ○ | ○ |

Ex.: Example
C. Ex.: Comparative Example

TABLE 15

| | resistance to heat embrittlement | retort resistance | taste and flavor retention properties 1a | taste and flavor retention properties 2a |
|---|---|---|---|---|
| Ex.13 | ○ | ○ | ⊚ | ○ |
| Ex.14 | ○ | ○ | ⊚ | ○ |
| Ex.15 | ○ | ○ | ⊚ | ⊚ |
| C.Ex.9 | Δ | Δ | ○ | Δ |
| C.Ex.10 | ○ | ○ | Δ | Δ |

Ex.: Example
C.Ex.: Comparative Example

Examples 16 to 20 and Comparative Example 11

A biaxially oriented polyester film was obtained in the same manner as in Example 15 except that the average particle diameter, particle size distribution, content, pore volume, specific surface area and compressive resistance of porous silica particles and the average particle diameter and content of inert globular particles (globular silica particles having a particle diameter ratio of 1.09) were changed as shown in Table 16 and Table 17. The results are shown in Table 18 and Table 19.

TABLE 16

| | porous silica particles | | | | | | | |
|---|---|---|---|---|---|---|---|---|
| | average particle diameter (μm) | particle size distribution (D70/D30) | content (wt %) | pore volume (ml/g) | specific surface area ($m^2$/g) | compressive resistance (MPa) | hydroxyl value (KOH · mg/g) | number of coarse particles (per $mm^2$) |
| Ex.16 | 2.0 | 2.0 | 0.1 | 1.5 | 200 | 20 | 150 | 3 |
| Ex.17 | 0.7 | 1.4 | 0.1 | 0.5 | 200 | 80 | 180 | 5 |
| Ex.18 | 0.7 | 1.4 | 0.1 | 2.0 | 200 | 20 | 180 | 5 |
| Ex.19 | 0.5 | 1.3 | 0.1 | 1.5 | 400 | 20 | 200 | 7 |
| Ex.20 | 0.7 | 1.4 | 0.15 | 1.5 | 200 | 20 | 150 | 7 |
| C.Ex.11 | 5.0 | 2.2 | 0.1 | 1.5 | 200 | 20 | 100 | 15 |

Ex.: Example
C.Ex.: Comparative Example

TABLE 17

|  | globular silica particles | | surface roughness Ra (nm) |
|---|---|---|---|
|  | average particle diameter (μm) | content (wt %) | |
| Ex. 16 | 0.3 | 0.1 | 15 |
| Ex. 17 | 0.3 | 0.1 | 12 |
| Ex. 18 | 0.3 | 0.1 | 9 |
| Ex. 19 | 0.3 | 0.1 | 15 |
| Ex. 20 | 0.8 | 0.05 | 16 |
| C. Ex. 11 | 0.3 | 0.1 | 30 |

Ex.: Example
C. Ex.: Comparative Example

TABLE 18

|  | resistance to hydrolysis | lamination properties | | deep drawability | |
|---|---|---|---|---|---|
|  |  | A | B | 1 | 3 |
| Ex. 16 | ○ | ○ | ○ | ○ | ○ |
| Ex. 17 | ○ | ○ | ○ | ○ | ○ |
| Ex. 18 | ○ | ○ | ○ | ○ | ○ |
| Ex. 19 | ○ | ○ | ○ | ○ | ○ |
| Ex. 20 | ○ | ○ | ○ | ○ | ○ |
| C. Ex. 11 | ○ | ○ | ○ | Δ | Δ |

Ex.: Example
C. Ex.: Comparative Example

TABLE 19

|  | impact resistance | resistance to heat embrittlement | retort resistance | taste and flavor retention properties | |
|---|---|---|---|---|---|
|  |  |  |  | 1a | 2a |
| Ex. 16 | ○ | ○ | ○ | ◎ | ◎ |
| Ex. 17 | ○ | ○ | ○ | ◎ | ◎ |
| Ex. 18 | ○ | ○ | ○ | ◎ | ◎ |
| Ex. 19 | ○ | ○ | ○ | ◎ | ◎ |
| Ex. 20 | ○ | ○ | ○ | ◎ | ◎ |
| C. Ex. 11 | Δ | Δ | Δ | Δ | X |

Ex.: Example
C. Ex.: Comparative Example

Examples 21 to 26 and
Comparative Examples 12 to 14

Copolyethylene terephthalate (containing 0.1 wt % of globular silica particles having an average particle diameter of 0.5 μm and a particle diameter ratio of 1.09) obtained using dicarboxylic acid components, ethylene glycol, diethylene glycol and polymerization catalyst shown in Table 20 to ensure that the contents of metals and phosphorus contained in the film became values shown in Table 21 was dried, melt extruded at 280° C. and solidified by quenching to obtain an unstretched film. Thereafter, this unstretched film was stretched to 3.0 times in a longitudinal direction at 110° C. and 3.0 times in a transverse direction at 120° C. and heat set at 180° C. to obtain a biaxially oriented film. Each of the obtained films had a thickness of 25 μm. The characteristic properties of each film are shown in Table 20 and the evaluation results of each film are shown in Tables 22 and 23. A mixed catalyst of TBT (tetrabuthoxytitanium) and TMT (trimellitic acid) used in Example 26 was prepared in the same manner as in Example 5.

TABLE 20

|  | characteristic properties of polymer | | | | characteristic properties of film | | | | |
|---|---|---|---|---|---|---|---|---|---|
|  | dicarboxylic acid component | | DEG component | polycondensation catalyst | IV | Tg | Tm | COOH | nz |
|  | (mol %) | (mol %) | (mol %) |  | (dl/g) | (° C.) | (° C.) | (eq/$10^6$ g) | (—) |
| Ex.21 | TA(90) | NDC(10) | 1.5 | TBT | 0.70 | 81 | 232 | 33 | 1.523 |
| Ex.22 | TA(82) | NDC(18) | 1.5 | TBT | 0.70 | 83 | 213 | 33 | 1.525 |
| Ex.23 | TA(90) | IA(10) | 1.5 | TBT | 0.70 | 74 | 232 | 33 | 1.520 |
| Ex.24 | TA(90) | IA(10) | 1.5 | TBT | 0.70 | 74 | 232 | 33 | 1.520 |
| Ex.25 | TA(90) | IA(10) | 1.5 | TBT | 0.70 | 74 | 232 | 33 | 1.520 |
| Ex.26 | TA(90) | IA(10) | 1.5 | TBT + TMT | 0.70 | 74 | 232 | 31 | 1.520 |
| C.Ex.12 | TA(90) | IA(10) | 1.0 | $Sb_2O_3$ | 0.70 | 82 | 234 | 33 | 1.523 |
| C.Ex.13 | TA(90) | IA(10) | 1.5 | $GeO_2$ | 0.70 | 81 | 232 | 33 | 1.523 |
| C.Ex.14 | TA(90) | IA(10) | 1.5 | TBT | 0.70 | 81 | 232 | 33 | 1.523 |

Ex.: Example
C.Ex.: Comparative Example

TABLE 21

| | metal contents of film | | | | | | |
|---|---|---|---|---|---|---|---|
| | Ti (mmol %) | P (mmol %) | Ak (ppm) | Ge (ppm) | Sb (ppm) | Ti/P | Ti + P |
| Ex.21 | 5 | 5 | 0 | 0 | 0 | 1.0 | 10 |
| Ex.22 | 5 | 5 | 0 | 0 | 0 | 1.0 | 10 |
| Ex.23 | 5 | 5 | 0 | 0 | 0 | 1.0 | 10 |
| Ex.24 | 5 | 5 | 0 | 0 | 0 | 1.0 | 10 |
| Ex.25 | 10 | 8 | 3 | 0 | 0 | 1.3 | 18 |
| Ex.26 | 5 | 5 | 0 | 0 | 0 | 1.0 | 10 |
| C.Ex.12 | 0 | 40 | 0 | 0 | 63 | 0.0 | 40 |
| C.Ex.13 | 0 | 35 | 0 | 113 | 0 | 0.0 | 35 |
| C.Ex.14 | 5 | 5 | 0 | 15 | 10 | 1.0 | 10 |

Ex.: Example
C.Ex.: Comparative Example

TABLE 22

| | resistance to hydrolysis | lamination properties | | deep drawability | |
|---|---|---|---|---|---|
| | | A | B | 1 | 2 |
| Ex. 21 | ○ | ○ | ○ | ○ | ○ |
| Ex. 22 | ○ | ○ | ○ | ○ | ○ |
| Ex. 23 | ○ | ○ | ○ | ○ | ○ |
| Ex. 24 | ○ | ○ | ○ | ○ | ○ |
| Ex. 25 | ○ | ○ | ○ | ○ | ○ |
| Ex. 26 | ○ | ○ | ○ | ○ | ○ |
| C. Ex. 12 | ○ | ○ | ○ | ○ | ○ |
| C. Ex. 13 | ○ | ○ | ○ | ○ | ○ |
| C. Ex. 14 | Δ | ○ | ○ | ○ | ○ |

Ex.: Example
C. Ex.: Comparative Example

TABLE 23

| | impact resistance | resistance to heat embrittlement | retort resistance | taste and flavor retention properties | |
|---|---|---|---|---|---|
| | | | | 1b | 2b |
| Ex. 21 | ○ | ○ | ○ | ⊙ | ⊙ |
| Ex. 22 | ○ | ○ | ○ | ⊙ | ⊙ |
| Ex. 23 | ○ | ○ | ○ | ⊙ | ○ |
| Ex. 24 | ○ | ○ | ○ | ⊙ | ○ |
| Ex. 25 | ○ | ○ | ○ | ⊙ | ○ |
| Ex. 26 | ○ | ○ | ○ | ⊙ | ⊙ |
| C. Ex. 12 | ○ | ○ | ○ | Δ | X |
| C. Ex. 13 | ○ | ○ | Δ | ○ | Δ |
| C. Ex. 14 | ○ | ○ | Δ | ○ | Δ |

Ex.: Example
C. Ex.: Comparative Example

What is claimed is:

1. A biaxially oriented polyester film to be laminated on a metal plate and molded, which comprises an aromatic polyester composition comprising:

(A) an aromatic polyester which comprises ethylene terephthalate as the main recurring unit and a titanium compound and a phosphorus compound both of which satisfy at least one of the following expressions (1) and (2):

$$0.1 \leq Ti/P \leq 3.0 \tag{1}$$
   $$5 \leq Ti+P \leq 60 \tag{2}$$

wherein Ti is the amount (mmol %) of elemental titanium of the titanium compound contained in the aromatic polyester and P is the amount (mmol %) of elemental phosphorus of the phosphorus compound contained in the aromatic polyester, and the following expression (3):

$$2 \leq Ti \leq 20 \tag{3}$$

wherein Ti is as defined hereinabove, and which contains alkali metal compounds, a germanium compound and an antimony compound in a total amount of not more than 3 ppm in terms of the total of elemental alkali metals, elemental germanium and elemental antimony; and (B) 0.05 to 5.0 wt % based on the aromatic polyester composition of inert fine particles having an average particle diameter of 2.5 μm or less.

2. The polyester film of claim 1, wherein the titanium compound contained in the aromatic polyester satisfies the following expression (3)-1:

$$4 \leq Ti \leq 20 \tag{3-1}$$

wherein Ti is as defined hereinabove.

3. The polyester film of claim 1, wherein the titanium compound and the phosphorus compound contained in the aromatic polyester satisfy at least one of the following expressions (1)-1 and (2)-1:

$$0.3 \leq Ti/P \leq 2.5 \tag{1-1}$$
   $$6 \leq Ti+P \leq 40 \tag{2-1}$$

wherein Ti and P are as defined hereinabove.

4. The polyester film of claim 1, wherein the aromatic polyester satisfies the following expression (4):

$$0.3 \leq (AA+P)/Ti 40 \tag{4}$$

wherein AA is the amount (mmol %) of acetaldehyde contained in the aromatic polyester and P and Ti are as defined hereinabove.

5. The polyester film of claim 4, wherein the aromatic polyester contains acetaldehyde in an amount of 0.1 to 40 mmol %.

6. The polyester film of claim 1, wherein the titanium compound is a compound represented by the following formula (5):

$$Ti(OR)_4 \tag{5}$$

wherein R is an alkyl group or phenyl group, with the proviso that four R's may be the same or different, or a reaction product between a compound represented by the above formula (5) and benzenepolycarboxylic acid represented by the following formula (6) or acid anhydride thereof:

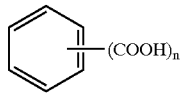

(6)

wherein n is 2, 3 or 4.

7. The polyester film of claim 1, wherein the aromatic polyester is a copolyester which comprises 82 mol % or more of terephthalic acid and 18 mol % or less of isophthalic acid as dicarboxylic acid components and 82 to 100 mol % of ethylene glycol and 0 to 18 mol % of a diol other than ethylene glycol as diol components.

8. The polyester film of claim 1, wherein the aromatic polyester is a copolyester which comprises 82 mol % or more of terephthalic acid and 18 mol % or less of 2,6-naphthalenedicarboxylic acid as dicarboxylic acid components and 82 to 100 mol % of ethylene glycol and 0 to 18 mol % of a diol other than ethylene glycol as diol components.

9. The polyester film of claim 7 or 8, wherein the diol other than ethylene glycol is diethylene glycol.

10. The polyester film of claim 9, wherein diethylene glycol is contained in an amount of 5 mol % or less based on the total of all the diol components.

11. The polyester film of claim 1, wherein the aromatic polyester has an intrinsic viscosity of 0.5 to 0.8 dl/g.

12. The polyester film of claim 1, wherein the aromatic polyester has a melting point of 210 to 250° C.

13. The polyester film of claim 1, wherein the aromatic polyester has a glass transition temperature of 70° C. or more.

14. The polyester film of claim 1, wherein the aromatic polyester has a terminal carboxyl group concentration of 40 eq/$10^6$ g or less.

15. The polyester film of claim 1, wherein the aromatic polyester has a melt resistivity of $1 \times 10^6$ to $5 \times 10^8$ Ω·cm at 290° C.

16. The polyester film of claim 1, wherein the inert fine particles (B) consist of non-porous globular fine particles having a particle diameter ratio (long diameter/short diameter) of 1.0 to 1.2 or a combination of the non-porous globular fine particles and porous fine particles.

17. The polyester film of claim 16, wherein the non-porous globular fine particles have an average particle diameter of 0.05 to 2.0 μm.

18. The polyester film of claim 16, wherein the non-porous globular fine particles are silica fine particles.

19. The polyester film of claim 16, wherein the porous fine particles have a particle size distribution of 1.2 to 2.0, a pore volume of 0.05 to 2.5 ml/g, a specific surface area of 50 to 600 m²/g and a compressive resistance of 1 to 100 MPa.

20. The polyester film of claim 16, wherein the porous fine particles are inorganic particles.

21. The polyester film of claim 16, wherein the porous fine particles have a particle size distribution of 1.3 to 1.9.

22. The polyester film of claim 16, wherein the porous fine particles have a hydroxyl value of 300 mgKOH/g or less.

23. The polyester film of claim 16, wherein the inert fine particles (B) consist of a combination of non-porous globular fine particles and porous fine particles and contain the non-porous globular fine particles in an amount of 0.01 to 0.5 wt %.

24. The polyester film of claim 16, wherein the inert fine particles (B) consist of a combination of non-porous globular fine particles and porous fine particles and contain the porous fine particles in an amount of 0.01 to 0.7 wt %.

25. The polyester film of claim 16, wherein the inert fine particles (B) consist of a combination of non-porous globular fine particles and porous fine particles, and the average particle diameter of the non-porous globular fine particles is smaller than the average particle diameter of the porous fine particles and in the range of 0.08 to 1.5 μm.

26. The polyester film of claim 1, wherein the inert fine particles consist of non-porous globular fine particles and are contained in an amount of 0.08 to 3.0 wt %.

27. The polyester film of claim 1 which contains coarse particles having a particle diameter of 20 μm or more at a density of not more than 10/mm².

28. The polyester film of claim 1 which has a refractive index in the film thickness direction of 1.500 to 1.540.

29. The polyester film of claim 1 which has a center line average surface roughness (Ra) of 30 nm or less.

30. The polyester film of claim 1 which has an extraction of 0.08 mg/cm² or less when it is treated with ion exchange water at 121° C. for 2 hours.

* * * * *